(12) United States Patent
Yoshino et al.

(10) Patent No.: US 12,535,338 B2
(45) Date of Patent: Jan. 27, 2026

(54) POSITION DETECTION DEVICE AND IMAGING DEVICE

(71) Applicant: Panasonic Intellectual Property Management Co., Ltd., Osaka (JP)

(72) Inventors: Kazuki Yoshino, Osaka (JP); Yutaka Minami, Osaka (JP); Yusuke Nagae, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 18/404,360

(22) Filed: Jan. 4, 2024

(65) Prior Publication Data

US 2024/0159571 A1   May 16, 2024

Related U.S. Application Data

(63) Continuation of application No. PCT/JP2022/024177, filed on Jun. 16, 2022.

(30) Foreign Application Priority Data

Jul. 14, 2021   (JP) .................. 2021-116056

(51) Int. Cl.
*G01D 5/16* (2006.01)
*H02K 11/215* (2016.01)
(Continued)

(52) U.S. Cl.
CPC ............. *G01D 5/16* (2013.01); *H02K 11/215* (2016.01); *H02P 6/16* (2013.01); *H04N 23/695* (2023.01)

(58) Field of Classification Search
CPC .. H02P 6/14; H02P 6/16; H02K 11/20; H02K 11/21; H02K 11/215; G01D 5/12;
(Continued)

(56) References Cited

U.S. PATENT DOCUMENTS

| 2006/0056833 | A1 | 3/2006 | Kushida | |
|---|---|---|---|---|
| 2011/0298921 | A1* | 12/2011 | Osada | H04N 23/58 310/12.14 |

(Continued)

FOREIGN PATENT DOCUMENTS

| JP | 2006-65238 | 3/2006 |
|---|---|---|
| JP | 2006-234688 | 9/2006 |

(Continued)

OTHER PUBLICATIONS

International Search Report issued Aug. 30, 2022 in International (PCT) Application No. PCT/JP2022/024177.

*Primary Examiner* — Huy Q Phan
*Assistant Examiner* — David B Frederiksen
(74) *Attorney, Agent, or Firm* — Wenderoth, Lind & Ponack, L.L.P.

(57) ABSTRACT

A position detection device includes a motor configured to rotate a drive target, a periodic sensor configured to detect a plurality of periods included in a periodic change generated by rotation of the motor, an origin sensor configured to detect an origin of the motor in a rotation direction, and a controller configured to control the rotation of the motor based on signals output from each of the periodic sensor and the origin sensor. A repeated detection error in detecting the origin of the motor by the origin sensor is smaller than a rotation range of the motor corresponding to each period of the plurality of periods detected by the periodic sensor.

4 Claims, 12 Drawing Sheets

(51) Int. Cl.
*H02P 6/16* (2016.01)
*H04N 23/695* (2023.01)

(58) Field of Classification Search
CPC ........... G01D 5/14; G01D 5/16; G01D 5/244; G01D 5/24471; G01D 5/24485; G01D 5/245; G01D 5/2454; G01D 5/2458; H04N 23/60; H04N 23/695
See application file for complete search history.

(56) References Cited

U.S. PATENT DOCUMENTS

| | | | | |
|---|---|---|---|---|
| 2012/0287328 A1* | 11/2012 | Kawai | ........................ | G03B 3/10 |
| | | | | 348/E5.042 |
| 2015/0061655 A1* | 3/2015 | Yoshida | ................ | G01R 33/09 |
| | | | | 324/207.21 |
| 2017/0242215 A1* | 8/2017 | Nakamura | ............... | G02B 7/08 |
| 2019/0277668 A1* | 9/2019 | Osada | ....................... | H02P 6/16 |
| 2021/0285754 A1* | 9/2021 | Kim | ..................... | G03B 17/561 |

FOREIGN PATENT DOCUMENTS

| | | | |
|---|---|---|---|
| JP | 2006-259520 | | 9/2006 |
| JP | 2009-36760 | | 2/2009 |
| JP | 2009036760 A | * | 2/2009 |
| JP | 2010-219880 | | 9/2010 |

* cited by examiner

FIG. 3
(a)
α: REPEATED DETECTION ERROR IN ORIGIN SENSOR DETECTING ORIGIN
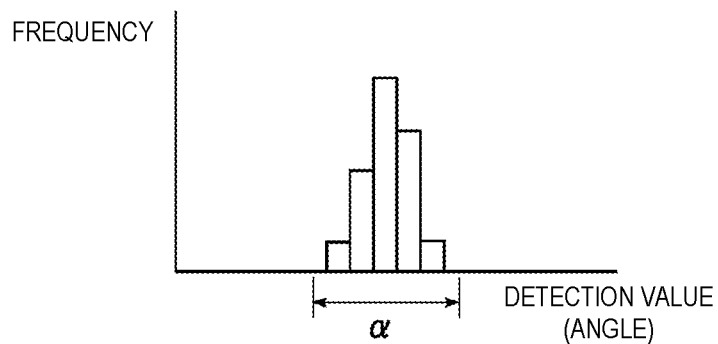
$\alpha < \beta$
(b)
β: ROTATION RANGE OF MOTOR CORRESPONDING TO EACH PERIOD OF PLURALITY OF PERIODS DETECTED BY PERIODIC SENSOR
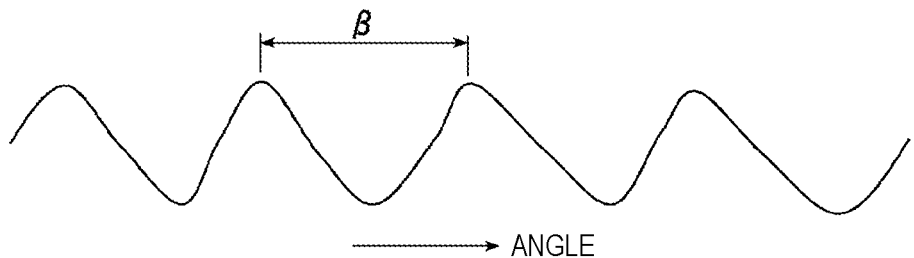

FIG. 11
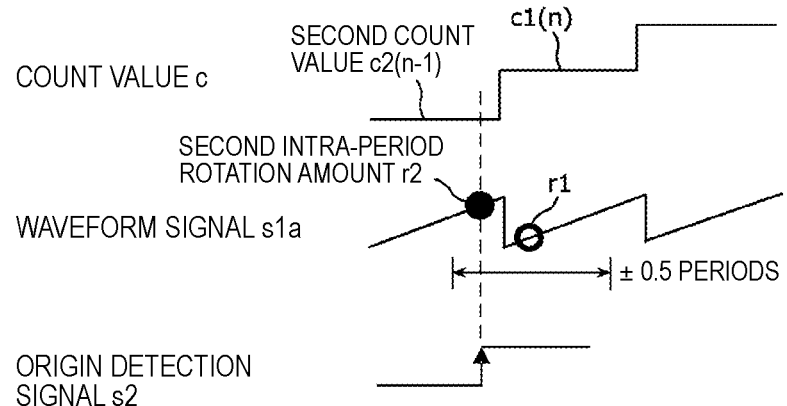
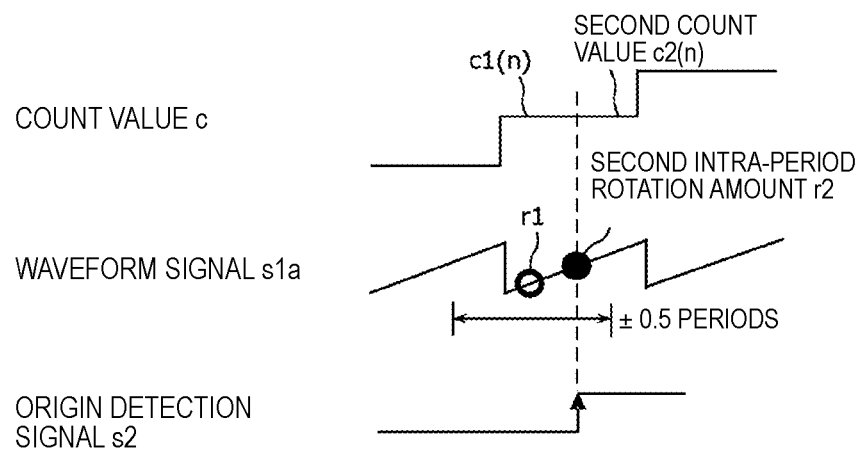

FIG. 13
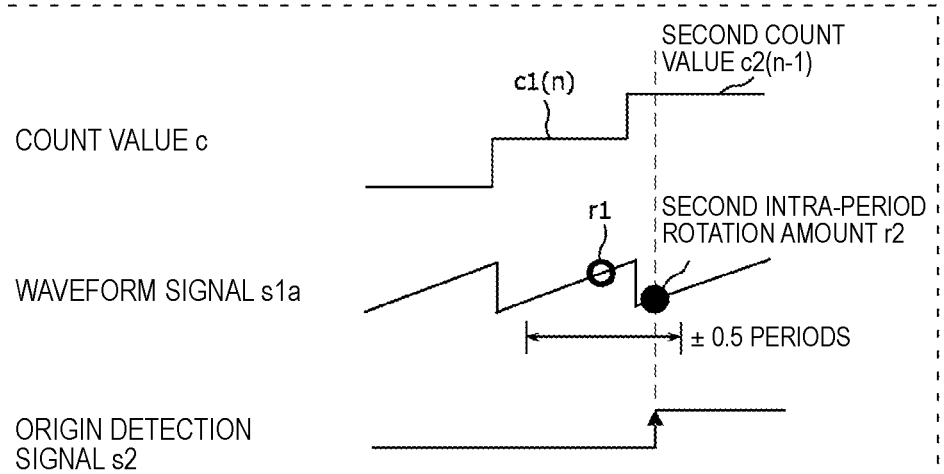
(a)
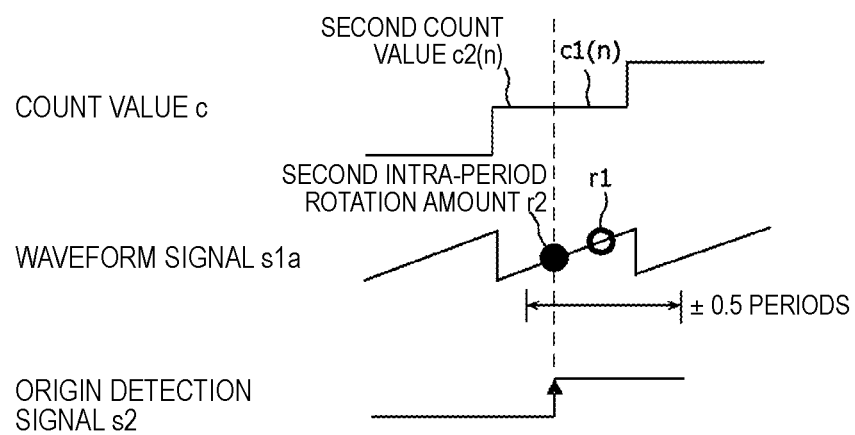
(b)

POSITION DETECTION DEVICE AND IMAGING DEVICE

BACKGROUND

1. Technical Field

The present disclosure relates to a position detection device and an imaging device including the position detection device.

2. Description of the Related Art

In the related art, a position detection device that detects positions of a camera in a tilt direction and a pan direction has been known. As an example of this type of position detection device, Unexamined Japanese Patent Publication No. 2010-219880 discloses a technology of measuring a detection level of a sensor for tilt direction detection while rotating a camera in a pan direction and detecting an origin in a tilt direction at a rotation position in the pan direction at which an influence of external light on the sensor is smallest. In accordance with this technology, the origin can be detected in a state where the influence of the external light on the sensor for tilt direction detection is reduced.

SUMMARY

In the position detection device, it is necessary to determine the origin again whenever power is turned on, but there is a problem that the position of the origin cannot be accurately reproduced in a case where there is detection variation, for example, when the origin is detected. In this case, the position of the origin varies whenever power is turned on, and the position of the camera cannot be accurately reproduced.

Therefore, an object of the present disclosure is to provide a position detection device and the like that can accurately reproduce a position of an origin.

A position detection device according to one aspect of the present disclosure includes a motor that rotates a drive target, a periodic sensor that detects a plurality of periods included in a periodic change generated by rotation of the motor, an origin sensor that detects an origin of the motor in a rotation direction, and a controller that controls the rotation of the motor based on signals output from each of the periodic sensor and the origin sensor. A repeated detection error in detecting the origin by the origin sensor is smaller than a rotation range of the motor corresponding to each period of the plurality of periods detected by the periodic sensor.

An imaging device according to one aspect of the present disclosure includes the above position detection device and the drive target including a camera.

In accordance with the position detection device and the like according to one aspect of the present disclosure, the position of the origin can be accurately reproduced.

BRIEF DESCRIPTION OF THE DRAWINGS

FIG. 3 is a diagram illustrating a repeated detection error in detecting an origin by an origin sensor and a rotation range of a motor corresponding to each period of a plurality of periods detected by a periodic sensor.

FIG. 11 is a diagram illustrating the origin set by resetting.

FIG. 13 is a diagram illustrating another example of the origin set by resetting.

DETAILED DESCRIPTION

Figure 1:
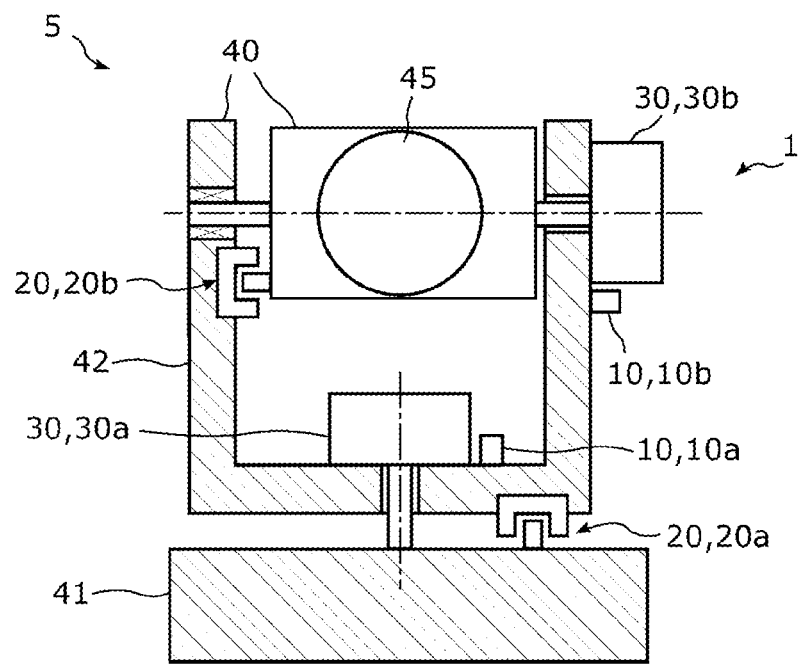
FIG. 1 is a diagram of an imaging device including a position detection device according to an exemplary embodiment as viewed from the front.

Hereinafter, exemplary embodiments will be described with reference to the drawings. The exemplary embodiments and the like to be described below provide comprehensive or specific examples. Numerical values, shapes, materials, constituent elements, disposition positions and connection modes of the constituent elements, steps, order of the steps, and the like illustrated in the following exemplary embodiments and the like are merely examples, and therefore are not intended to limit the present disclosure. In addition, of constituent elements in the following exemplary embodiments and the like, constituent elements that are not recited in the independent claims will be described as optional constituent elements.

In addition, the drawings are schematic views and are not necessarily strictly illustrated. In addition, in the drawings, substantially the same configurations are designated by the same reference marks, and duplicate description may be omitted or simplified. In addition, even in a case where the same object is illustrated in the drawings, a scale may be changed for the sake of convenience.

In addition, in the present specification, terms indicating a relationship between elements, such as coincidence, equal, and parallel, terms indicating a shape of an element, such as plate-shape and rectangular shape, numerical values, and numerical ranges are not expressions representing only strict meanings, but are expressions meaning to include a substantially equivalent range, for example, a difference of about several %.

Exemplary Embodiment

[Configuration of Position Detection Device and Imaging Device]

Configurations of a position detection device and an imaging device according to an exemplary embodiment will be described with reference to FIGS. 1 to 5.

FIG. 1 is a diagram of imaging device 5 including position detection device 1 according to the exemplary embodiment as viewed from the front.

Imaging device 5 is, for example, a device that performs imaging by moving camera 45 in a pan direction and a tilt direction. For example, in a case where imaging device 5 is installed on a ceiling, the imaging device 5 is installed upside down illustrated in FIG. 1.

Imaging device 5 includes drive target 40 and position detection device 1.

Drive target 40 includes camera 45, first base 41 serving as a base, and second base 42 provided on first base 41. Camera 45 is, for example, a visible light camera, a near-infrared light camera, or a camera that can detect visible light and near-infrared light. First base 41 is fixed to a construction material such as a ceiling. Second base 42 includes a flat plate and two side plates vertically erected from the flat plate.

Position detection device 1 can rotate drive target 40 including camera 45 in the pan direction and the tilt direction. In addition, position detection device 1 can detect the position of camera 45 in the pan direction and the tilt direction.

Position detection device 1 includes a plurality of motors 30a and 30b, a plurality of periodic sensors 10a and 10b, a plurality of origin sensors 20a and 20b, and controller 50.

The plurality of motors 30a and 30b are, for example, stepping motors, and rotation angles are changed by control commands output from controller 50. Motor 30a is fixed to the flat plate of second base 42, and a rotation shaft of motor 30a is connected to first base 41 via a shaft member extending in a vertical direction. Motor 30b is fixed to one side plate of second base 42, and a rotation shaft of motor 30b is connected to camera 45 via a shaft member extending in a horizontal direction. Position detection device 1 employs a direct drive structure in which drive target 40 or camera 45 is directly rotated by motors 30a and 30b.

For example, second base 42 and camera 45 are rotated in the pan direction with first base 41 as a base by rotating motor 30a, and camera 45 can be rotated in the tilt direction with second base 42 as a base by rotating motor 30b. For example, a movable range of motor 30a is 360°, and a movable range of motor 30b is 90°.

Hereinafter, both or one of motors 30a and 30b may be referred to as motor 30. In addition, both or one of periodic sensors 10a and 10b may be referred to as periodic sensor 10, and both or one of origin sensors 20a and 20b may be referred to as origin sensor 20.

Figure 2:
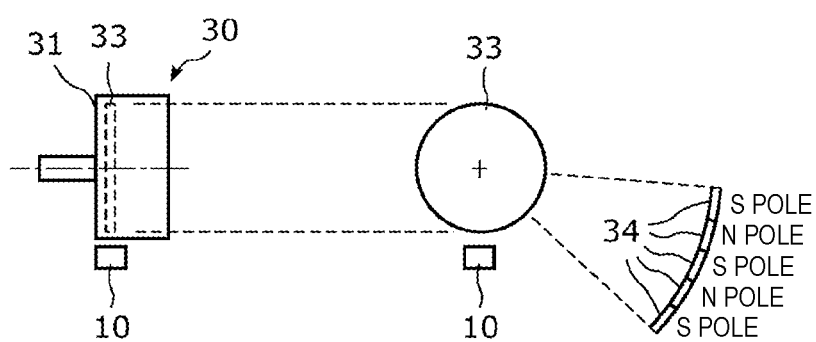
FIG. 2 is a schematic view of a motor included in the position detection device according to the exemplary embodiment.

FIG. 2 is a schematic view of motor 30 and periodic sensor 10 included in position detection device 1.

Motor 30 includes motor body 31 and sensor magnet 33 connected to the rotation shaft of motor 30.

Sensor magnet 33 has a plurality of magnetic poles 34 arranged along a rotation direction of motor 30. The plurality of magnetic poles 34 are magnetized such that S poles and N poles are alternately arranged along the rotation direction. The number of magnetic poles 34 of sensor magnet 33 is, for example, 432. The plurality of magnetic poles 34 rotationally move with the rotation of motor 30. The plurality of magnetic poles 34 rotationally move, and thus, changes in magnetic field are generated in motor body 31 and near motor body 31.

Periodic sensor 10 is disposed near sensor magnet 33 and detects a plurality of periods included in a periodic change generated by the rotation of motor 30. Periodic sensor 10 is, for example, a magneto resistance (MR) sensor, and detects a plurality of periods by detecting changes in magnetic field generated by rotational movement of the plurality of magnetic poles 34. The above periods included in the periodic change are in one-to-one correspondence with magnetization periods of the plurality of magnetic poles 34 arranged along the rotation direction of motor 30.

For example, periodic sensor 10a that detects the rotation of motor 30a in the pan direction is fixed to the flat plate of second base 42, and periodic sensor 10b that detects the rotation of motor 30b in the tilt direction is fixed to the side plate of second base 42. Each of periodic sensors 10a and 10b detects a plurality of periods in a movable range of each of motors 30a and 30b. For example, periodic sensor 10a detects 432 periods while motor 30a rotates 360°. For example, periodic sensor 10b detects 108 periods while motor 30b rotates by 90°. Each of periodic sensors 10a and 10b outputs waveform signal s1 including a plurality of periods to controller 50.

Origin sensor 20 detects an origin of motor 30 in the rotation direction. Origin sensor 20 is, for example, a transmissive photoelectric sensor, and includes a photo-interrupter and a shielding member that shields light projected and received by the photo-interrupter. For example, the photo-interrupter of origin sensor 20a that detects an origin of motor 30a in the pan direction is fixed to the flat plate of second base 42, and the shielding member is fixed to first base 41. In addition, the photo-interrupter of origin sensor 20b that detects an origin of motor 30b in the tilt direction is fixed to the side plate of second base 42, and the shielding member is fixed to camera 45.

Each of origin sensors 20a and 20b detects the origin once in the movable range of each of motors 30a and 30b. For example, origin sensor 20a detects the origin once while drive target 40 including camera 45 rotates by 360°. For example, origin sensor 20b detects the origin once while camera 45 rotates by 90°. Each of origin sensors 20a and 20b outputs an origin detection signal s2 indicating that the origin is detected to controller 50.

In position detection device 1, it is necessary to determine the origin by performing origin return whenever power is turned on, but a repeated detection error occurs when the origin is detected. The repeated detection error is a detection variation when the origin is repeatedly detected. In the present exemplary embodiment, the repeated detection error in detecting the origin by origin sensor 20 has the following configuration.

FIG. 3 is a diagram illustrating a repeated detection error $\alpha$ in detecting the origin by origin sensor 20 and a rotation range $\beta$ of motor 30 corresponding to each period of the plurality of periods detected by periodic sensor 10. Part (a) of FIG. 3 is a diagram schematically illustrating a frequency distribution of detection values when the origin is detected by origin sensor 20. Part (b) of FIG. 3 is a diagram schematically illustrating a plurality of periods detected by periodic sensor 10. Each of repeated detection error $\alpha$ and rotation range $\beta$ of motor 30 is a value represented by an angle.

As illustrated in FIG. 3, in the present exemplary embodiment, repeated detection error $\alpha$ in detecting the origin by origin sensor 20 is smaller than rotation range $\beta$ of motor 30 corresponding to each period of the plurality of periods detected by periodic sensor 10. In other words, rotation range β of motor 30 corresponding to each period is designed to be larger than repeated detection error α in detecting the origin. As a result, it is possible to accurately reproduce a position of the origin.

Figure 4:
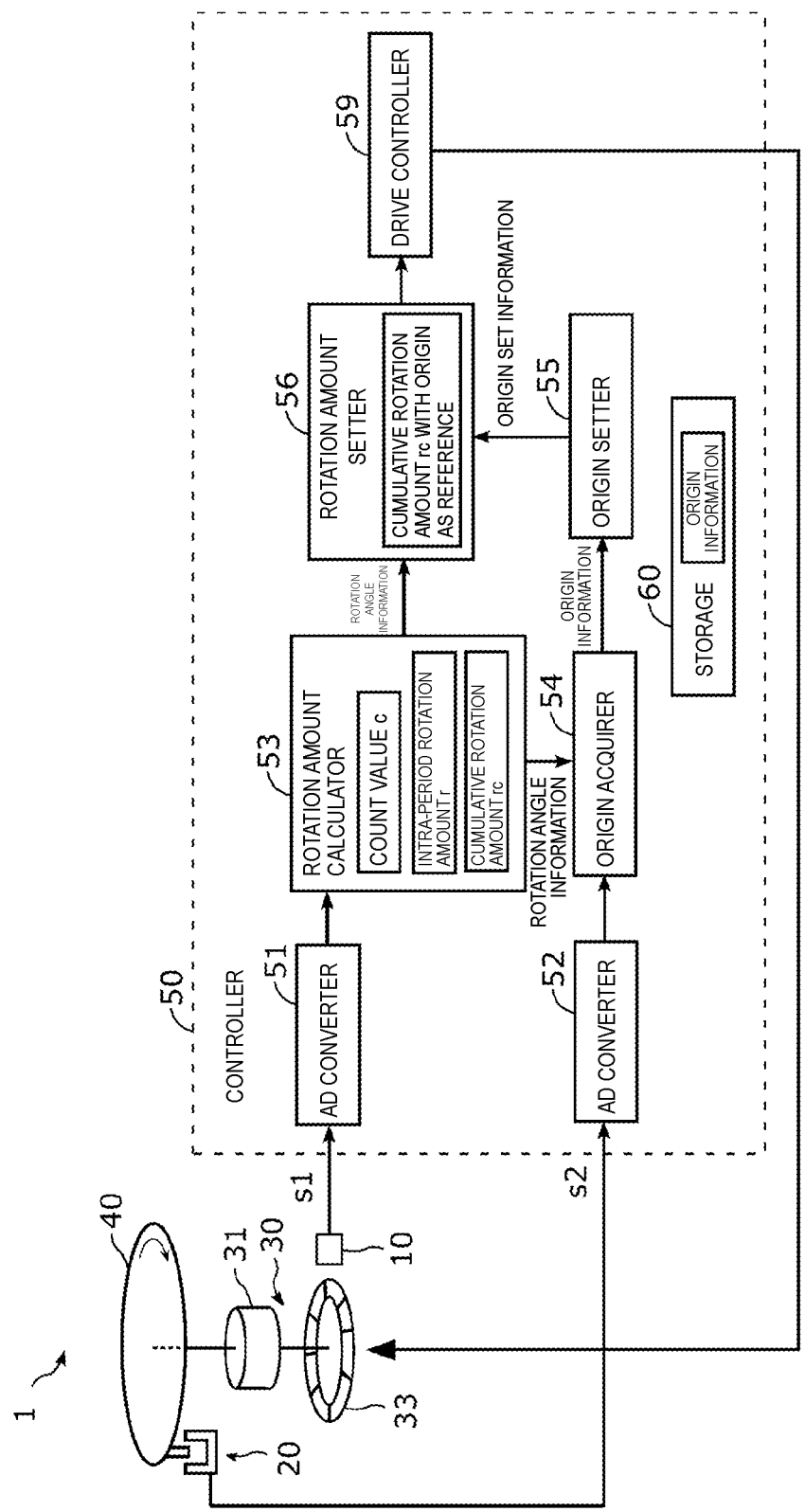
FIG. 4 is a block configuration diagram of the position detection device according to the exemplary embodiment.

FIG. 4 is a block configuration diagram of position detection device 1. In the drawing, drive target 40 and magnetic poles 34 of sensor magnet 33 are illustrated in a simplified manner. Here, although motor 30 rotating in the pan direction will be described as an example, the same applies to motor 30 rotating in the tilt direction.

As illustrated in FIG. 4, position detection device 1 includes motor 30, periodic sensor 10, origin sensor 20, and controller 50. Motor 30, periodic sensor 10, and origin sensor 20 are as described above.

Controller 50 includes AD converters 51 and 52, rotation amount calculator 53, origin acquirer 54, origin setter 55, rotation amount setter 56, drive controller 59, and storage 60. Controller 50 includes a processor such as a central processing unit (CPU), storage 60 including a volatile memory and a nonvolatile memory, and a program stored in storage 60. A functional block configuration of controller 50 is realized by executing the program.

AD converter 51 acquires waveform signal s1 output from periodic sensor 10, performs AD conversion, and outputs the waveform signal s1 to rotation amount calculator 53. Rotation amount calculator 53 calculates count value c, intra-period rotation amount r of the motor, and cumulative rotation amount rc of the motor based on the signal output from AD converter 51.

Figure 5:
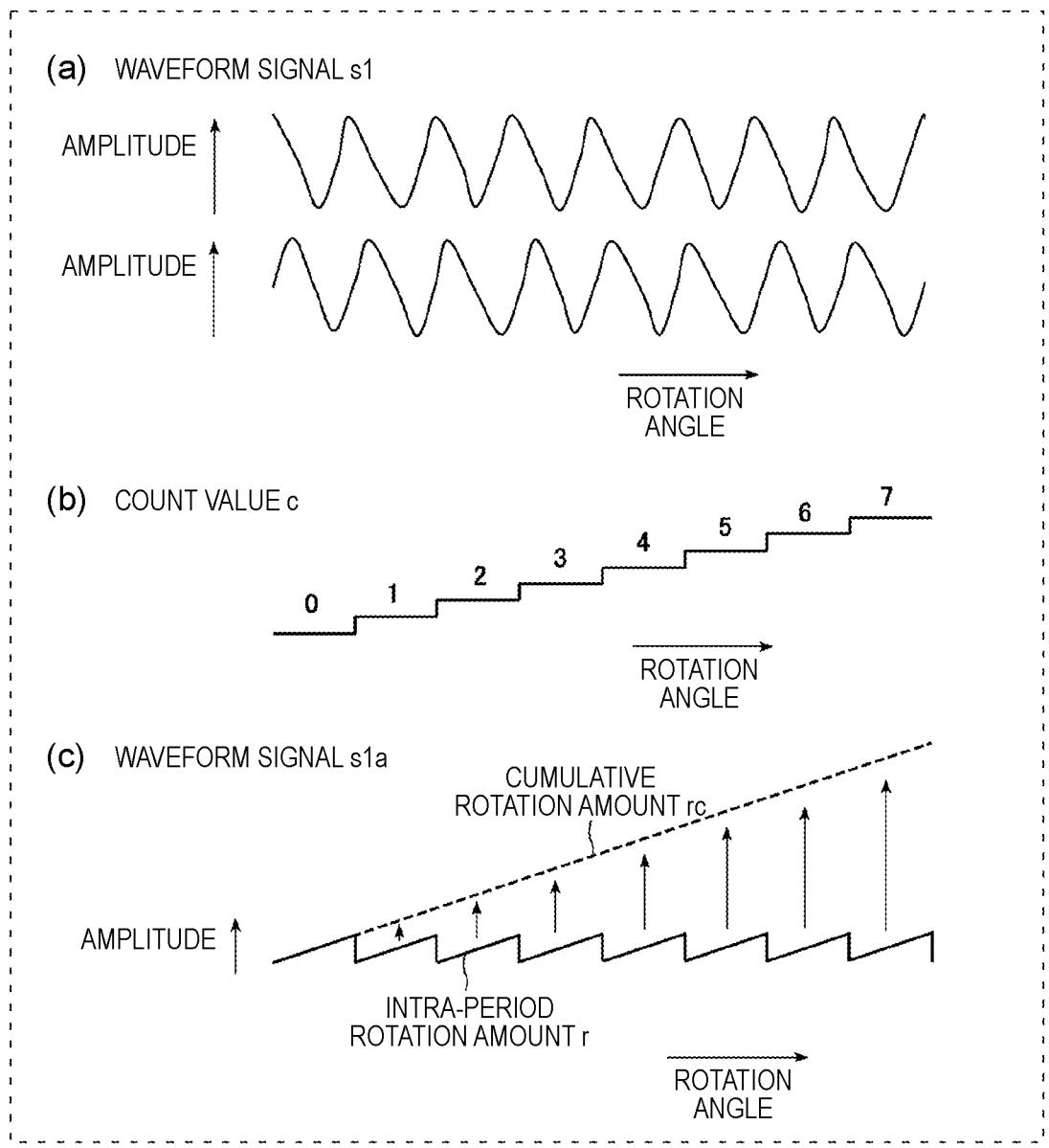
FIG. 5 is a diagram illustrating a waveform signal input to a controller of the position detection device according to the exemplary embodiment, a count value, an intra-period rotation amount of the motor, and a cumulative rotation amount of the motor that are calculated by the controller.

FIG. 5 is a diagram illustrating waveform signal s1 input to controller 50 of position detection device 1, count value c, intra-period rotation amount r of motor 30, and cumulative rotation amount rc of motor 30 that are calculated by controller 50. Note that, in FIG. 5, in order to facilitate understanding, waveform signal s1, count value c, intra-period rotation amount r, and cumulative rotation amount rc are expressed as analog data.

A horizontal axis in FIG. 5 represents the rotation angle of motor 30 in a case where motor 30 is rotated from one end to the other end in the movable range of motor 30.

As illustrated in part (a) of FIG. 5, waveform signals s1 having two phases different by 90° are input to controller 50. Each of waveform signals s1 having two phases is a sinusoidal signal, and an amplitude on a vertical axis corresponds to an output voltage of periodic sensor 10.

Part (b) of FIG. 5 illustrates count value c obtained by integrating periods included in waveform signal s1 having one phase out of waveform signals s1 having two phases. For example, in a case where waveform signal s1 when motor 30 is rotated by 360° has 432 periods, since one period is about 0.83°, count value c is counted up whenever motor 30 is rotated by about 0.83°.

Part (c) of FIG. 5 illustrates sawtooth waveform signal s1a generated by calculation based on waveform signals s1 having two phases. Waveform signal s1a has the same period as waveform signal s1 having one phase out of waveform signals s1 having two phases, and an amplitude changes in proportion to the rotation angle of motor 30.

Rotation amount calculator 53 illustrated in FIG. 4 acquires the rotation angle of motor 30 within the period, that is, intra-period rotation amount r by reading sawtooth waveform signal s1a. In addition, rotation amount calculator 53 acquires cumulative rotation amount rc of motor 30 (see part (c) of FIG. 5) by accumulating intra-period rotation amounts r of the periods. Rotation amount calculator 53 outputs rotation angle information including count value c described above and intra-period rotation amount r and cumulative rotation amount rc of motor 30 to origin acquirer 54, origin setter 55, rotation amount setter 56, and storage 60. The rotation angle information is used when the origin of motor 30 is set and when the rotation amount of motor 30 is set.

AD converter 52 illustrated in FIG. 4 acquires origin detection signal s2 output from origin sensor 20 and performs AD conversion. AD converter 52 outputs AD-converted origin detection signal s2 to origin acquirer 54.

Origin acquirer 54 acquires the position of the origin based on origin detection signal s2 and the rotation angle information output from rotation amount calculator 53. Specifically, origin acquirer 54 acquires count value c and intra-period rotation amount r of motor 30 when origin sensor 20 detects the origin from rotation amount calculator 53, and specifies the position of the origin. Origin information including the position of the origin specified by origin acquirer 54 is output to origin setter 55 and storage 60.

Storage 60 stores the origin information and the like output from origin acquirer 54. The origin information includes the above-described rotation angle information.

When the origin of motor 30 is initially set, origin setter 55 sets the origin based on the origin information output from origin acquirer 54. In addition, when the origin of motor 30 is reset, origin setter 55 resets the origin based on the origin information output from origin acquirer 54 and the origin information read from storage 60. Origin set information set by origin setter 55 is output to rotation amount setter 56. Specific examples of these pieces of information will be described later.

Rotation amount setter 56 sets cumulative rotation amount rc of motor 30 with the origin as a reference based on the origin set information output from origin setter 55 and the rotation angle information output from rotation amount calculator 53, and outputs the set information to drive controller 59. Drive controller 59 controls the rotation of motor 30 based on the signal output from rotation amount setter 56.

As described above, controller 50 obtains intra-period rotation amount r of motor 30 within each period of the plurality of periods and count value c that is an integrated value of the plurality of periods based on waveform signal s1, and obtains the origin of motor 30 based on origin detection signal s2. As a result, controller 50 can acquire cumulative rotation amount rc that is a cumulative value of intra-period rotation amounts r of motor 30 with the origin as the reference, and can control the rotation of motor 30.

[Origin Setting Method of Position Detection Device]

An origin setting method of position detection device 1 will be described with reference to FIGS. 6 to 11. In this example, a scene in which the origin of motor 30 is initially set and a scene in which the origin of motor 30 is reset are separately described. Note that, here, although motor 30 rotating in the pan direction will be described as an example, the same applies to motor 30 rotating in the tilt direction.

Figure 6:
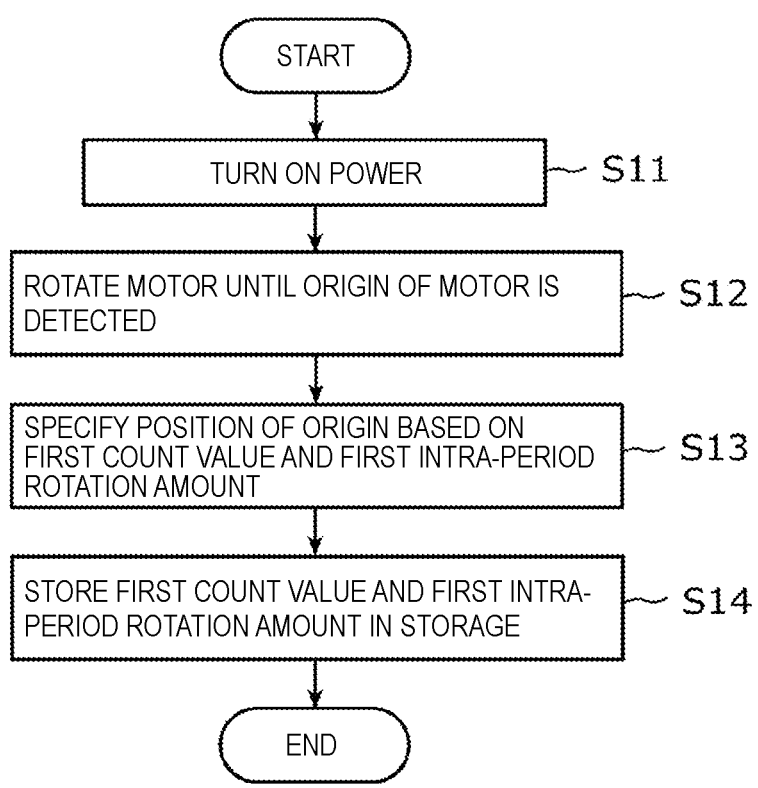
FIG. 6 is a flowchart illustrating an operation of the position detection device when the origin of the motor is initially set.
Figure 7:
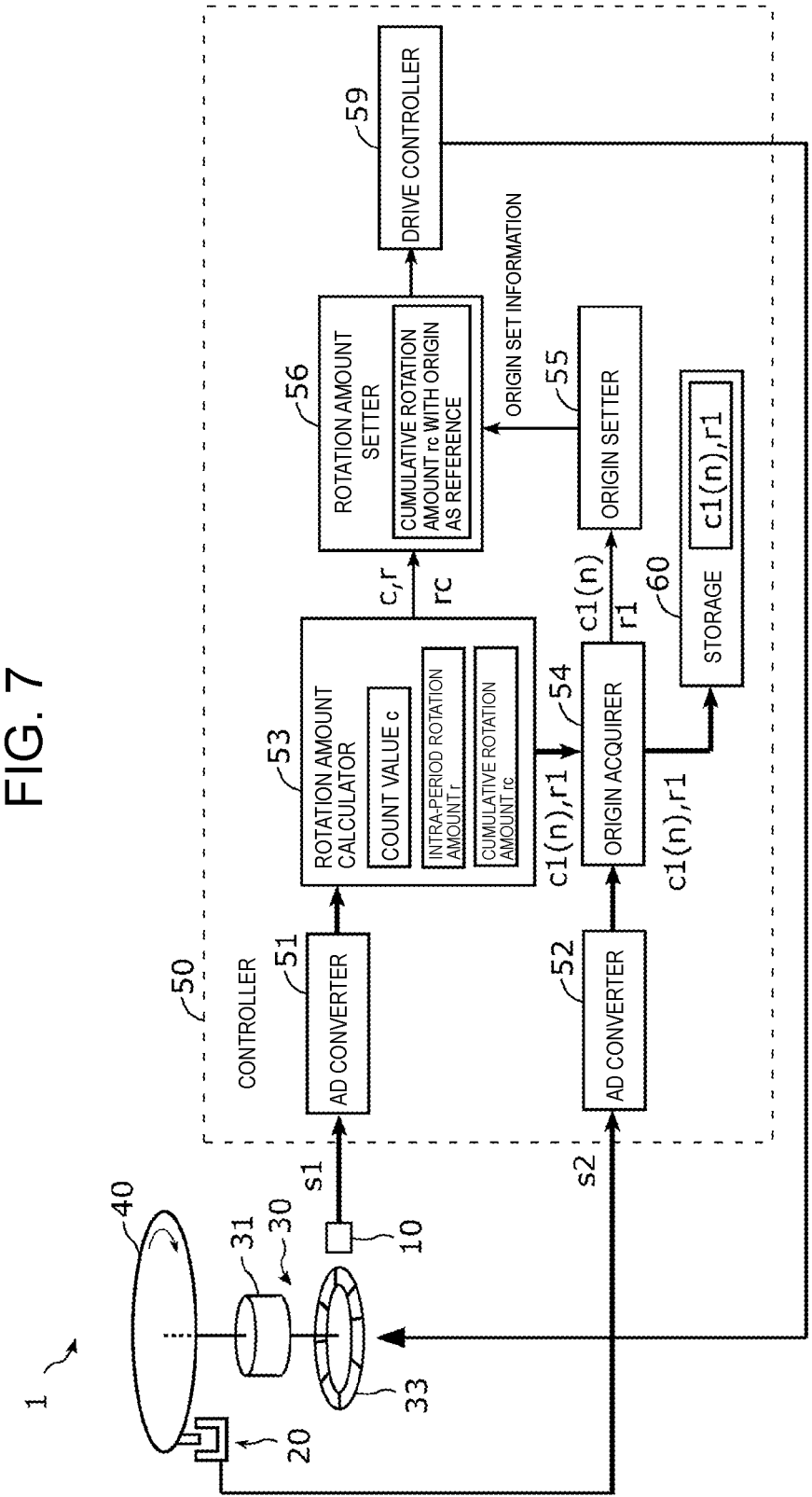
FIG. 7 is a diagram illustrating kinds of processing executed by the position detection device when the origin of the motor is initially set.

FIG. 6 is a flowchart illustrating an operation of position detection device 1 when the origin of motor 30 is initially set. FIG. 7 is a diagram illustrating kinds of processing executed by position detection device 1 when the origin of motor 30 is initially set.

First, position detection device 1 is powered on, and thus, information regarding the origin of motor 30 is initialized (step S11).

Subsequently, controller 50 rotates motor 30 until the origin of motor 30 is detected. Origin sensor 20 detects the origin of motor 30 by the rotation of motor 30 (step S12). Origin sensor 20 outputs origin detection signal s2 to origin acquirer 54. In addition, periodic sensor 10 outputs waveform signal s1 to rotation amount calculator 53.

Origin acquirer 54 acquires, from rotation amount calculator 53, first count value c1 and first intra-period rotation amount r1 when origin sensor 20 detects the origin. Specifically, origin acquirer 54 acquires, from rotation amount calculator 53, a first count value c1 that is an integrated value of a plurality of periods when origin detection signal s2 is acquired, and first intra-period rotation amount r1 that is an intra-period rotation amount of motor 30 in a period corresponding to first count value c1. Origin acquirer 54 specifies the position of the origin based on acquired first count value c1 and first intra-period rotation amount r1 (step S13).

Figure 8:
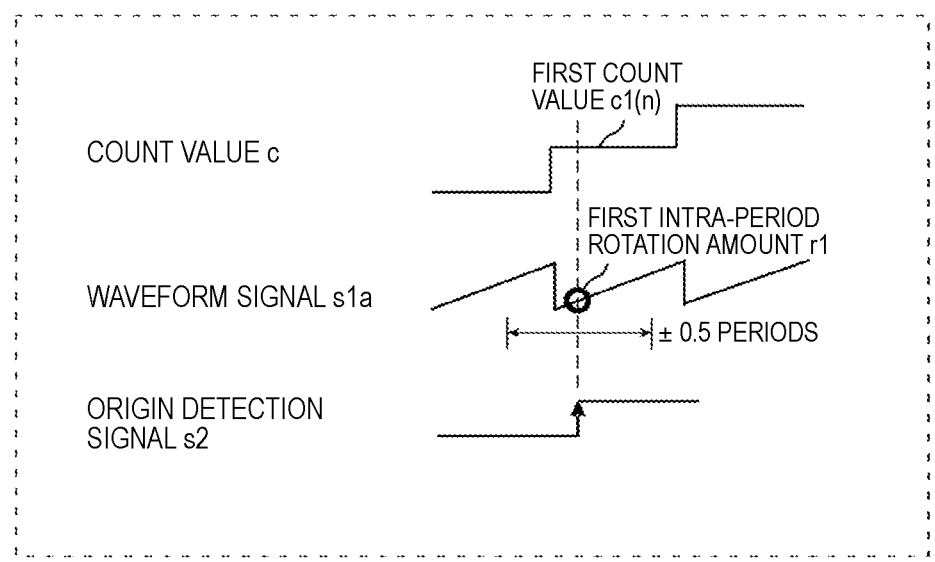
FIG. 8 is a diagram illustrating the origin set by initial setting.

FIG. 8 is a diagram illustrating an origin set by initial setting.

An upper part of FIG. 8 illustrates count value c indicating an integrated value of a plurality of periods and first count value $c1(n)$ that is an integrated value of a plurality of periods when origin detection signal s2 is acquired. Note that, an actual count value is indicated in parentheses of count value c1. In waveform signal s1a in a middle stage of FIG. 8, first intra-period rotation amount r1 that is an intra-period rotation amount of motor 30 in a period corresponding to first count value $c1(n)$ is indicated by a white circle. A position of the white circle coincides with a rising trigger of origin detection signal s2 illustrated in a lower part of FIG. 8.

Controller 50 stores first count value $c1(n)$ and first intra-period rotation amount r1 acquired by origin acquirer 54 in storage 60 (step S14). Through these steps S11 to S13, the initial setting of the origin of motor 30 is ended. Controller 50 of position detection device 1 controls the rotation of motor 30 based on the initially set origin.

Subsequently, the operation of position detection device 1 in a scene in which the origin of motor 30 is reset will be described. In a case where the origin of motor 30 is reset, the origin is set again by using first count value $c1(n)$ and first intra-period rotation amount r1 stored in step S14.

Figure 9:
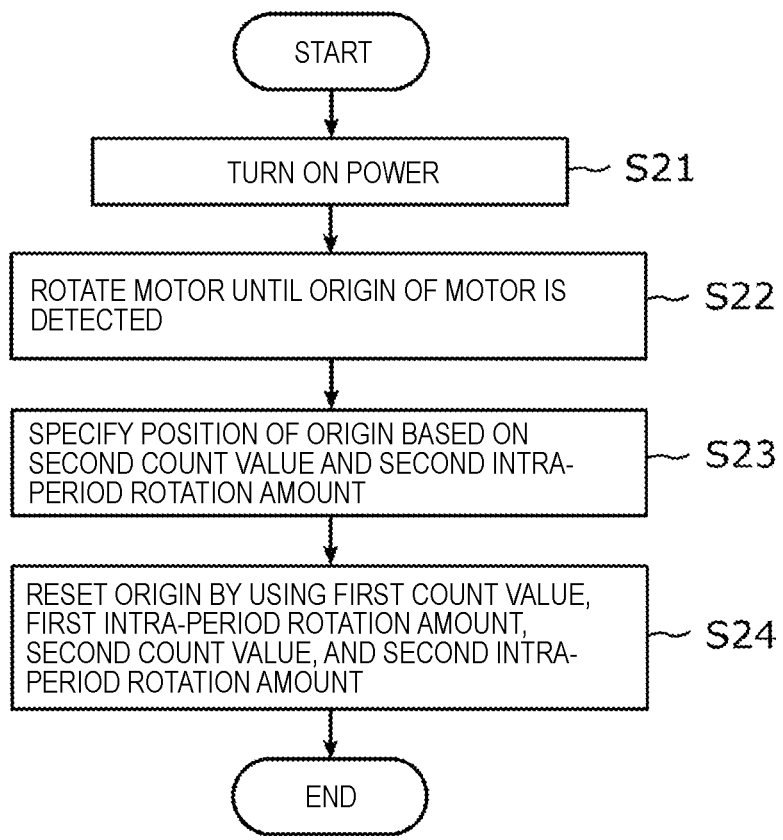
FIG. 9 is a flowchart illustrating an operation of the position detection device when the origin of the motor is reset.
Figure 10:
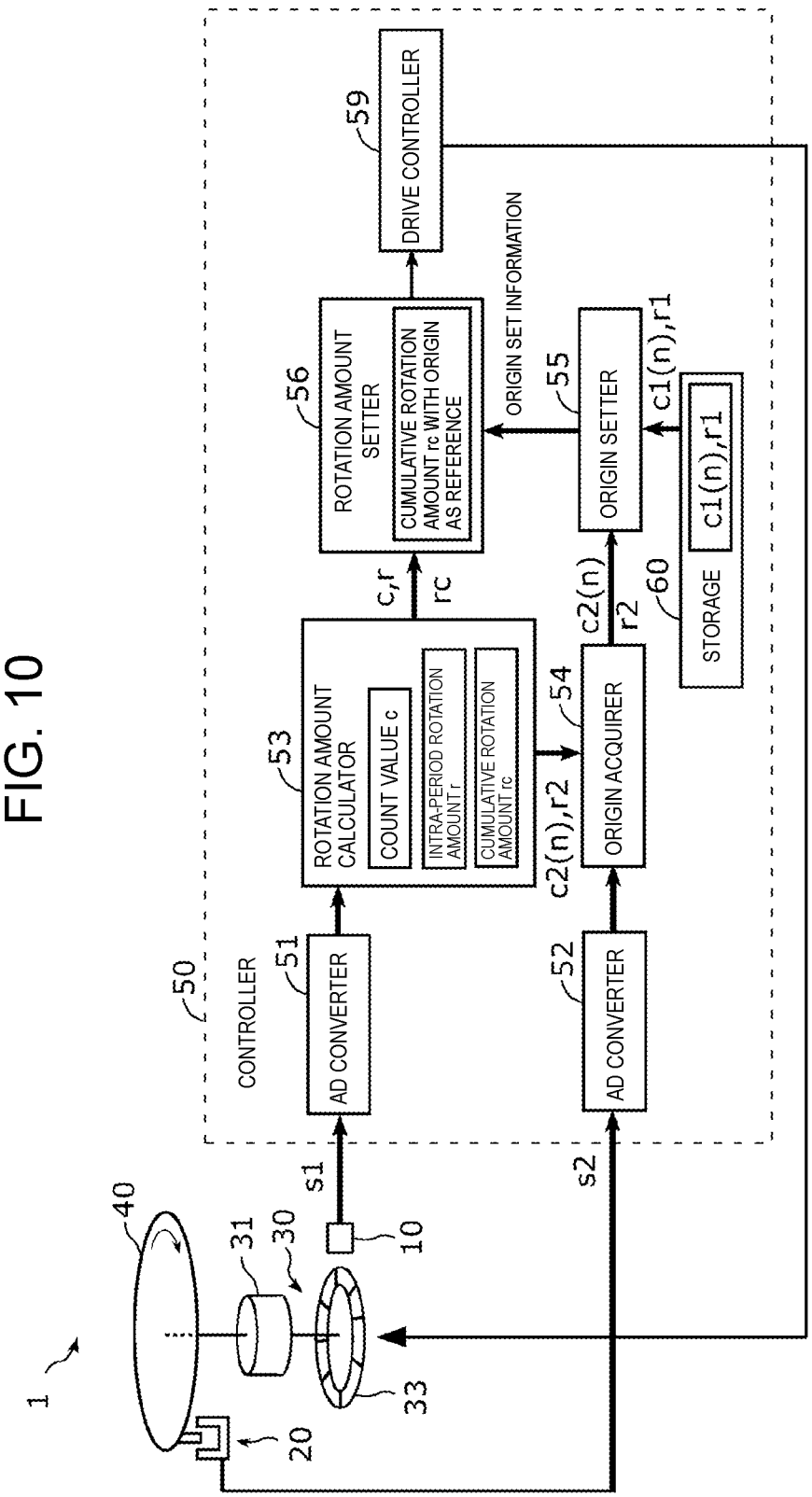
FIG. 10 is a diagram illustrating kinds of processing executed by the position detection device when the origin of the motor is reset.

FIG. 9 is a flowchart illustrating the operation of position detection device 1 when the origin of motor 30 is reset. FIG. 10 is a diagram illustrating kinds of processing executed by position detection device 1 when the origin of the motor is reset.

First, position detection device 1 is powered on, and thus, the temporarily stored data is initialized (step S21). Note that, first count value $c1(n)$ and first intra-period rotation amount r1 in storage 60 are continuously stored without being erased.

Subsequently, controller 50 rotates motor 30 until the origin of motor 30 is detected. Origin sensor 20 detects the origin of motor 30 by the rotation of motor 30 (step S22). Origin sensor 20 outputs origin detection signal s2 to origin acquirer 54. In addition, periodic sensor 10 outputs waveform signal s1 to rotation amount calculator 53.

Origin acquirer 54 acquires second count value c2 and second intra-period rotation amount r2 when origin sensor 20 detects the origin from rotation amount calculator 53. Specifically, origin acquirer 54 acquires, from rotation amount calculator 53, second count value c2 that is an integrated value of a plurality of periods when origin detection signal s2 is acquired and second intra-period rotation amount r2 that is an intra-period rotation amount of motor 30 in a period corresponding to second count value c2. Origin acquirer 54 specifies the position of the origin based on acquired second count value c2 and second intra-period rotation amount r2 (step S23). The origin information regarding the origin acquired by origin acquirer 54, that is, second count value c2 and second intra-period rotation amount r2 are output to origin setter 55.

Origin setter 55 resets the origin by using first count value $c1(n)$ and first intra-period rotation amount r1 stored in storage 60 and second count value c2 and second intra-period rotation amount r2 calculated in step S23 (step S24).

FIG. 11 is a diagram illustrating an origin set by resetting.

An upper part of part (a) of FIG. 11 illustrates count value c2 indicating an integrated value of a plurality of periods and second count value $c2(n-1)$ that is an integrated value of a plurality of periods when origin detection signal s2 is acquired. Note that, an actual count value is indicated in parentheses of count value c2. In waveform signal s1a in a middle stage of part (a) of FIG. 11, second intra-period rotation amount r2 that is an intra-period rotation amount of motor 30 in a period corresponding to second count value $c2(n-1)$ is indicated by a black circle. A position of the black circle coincides with a rising trigger of origin detection signal s2 illustrated in a lower part of part (a) of FIG. 11.

In addition, as illustrated in part (a) of FIG. 11, second intra-period rotation amount r2 corresponding to origin detection signal s2 falls within ±0.5 periods with, as a reference, first intra-period rotation amount r1 within the period of the period corresponding to first count value $c1(n)$. This configuration is realized by designing repeated detection error α in detecting the origin to be smaller than rotation range β of motor 30 corresponding to each period of the plurality of periods detected by periodic sensor 10. It is possible to accurately reproduce the position of the origin by this design.

A specific example of the method for setting the origin will be described with reference to parts (a) and (b) of FIG. 11.

As illustrated in part (a) of FIG. 11, in a case where second intra-period rotation amount r2 is positioned in a period different from the period corresponding to first count value $c1(n)$, controller 50 corrects the origin by causing first count value $c1(n)$ to coincide with second count value $c2(n-1)$. In this example, since second intra-period rotation amount r2 is at count value $c2(n-1)$ different from first count value $c1(n)$, the count value is decremented by one, and first count value $c1(n)$ is changed to count value $c2(n-1)$. The position of the origin is a value expressed by count value $c2(n-1)$ and second intra-period rotation amount r2.

In addition, as illustrated in part (b) of FIG. 11, in a case where second intra-period rotation amount r2 is positioned at the same period as the period corresponding to first count value $c1(n)$, controller 50 sets the origin by using first count value $c1(n)$ as it is. That is, in this example, since second intra-period rotation amount r2 is at same count value $c2(n)$ as first count value $c1(n)$, a value of first count value $c1(n)$ is maintained. The position of the origin is a value expressed by count value $c1(n)$ and second intra-period rotation amount r2. The origin reset as described above is an origin when power is turned on again.

The reset origin set information is output to rotation amount setter 56. Rotation amount setter 56 sets cumulative rotation amount rc of motor 30 with the origin as a reference based on the origin set information output from origin setter 55 and the rotation angle information output from rotation amount calculator 53, and outputs the set information to drive controller 59.

[Another Example in which Origin is Set]

Subsequently, another example in which the origin is set will be described.

Figure 12:
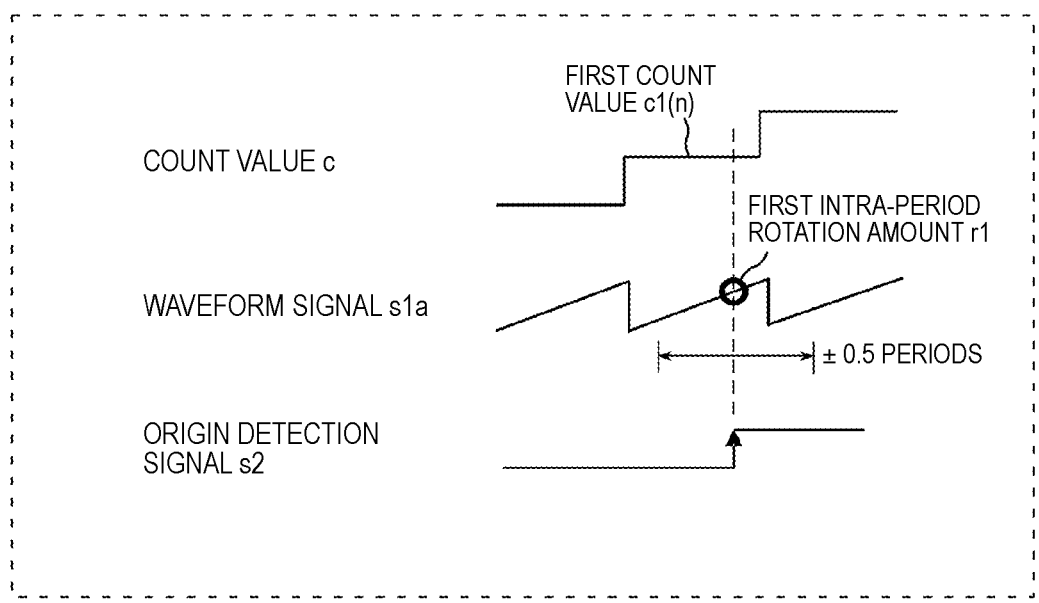
FIG. 12 is a diagram illustrating another example of the origin set by initial setting.

FIG. 12 is a diagram illustrating another example of the origin set by initial setting. An upper part of FIG. 12 illustrates count value c indicating an integrated value of a plurality of periods and first count value c1(n) that is an integrated value of a plurality of periods when origin detection signal s2 is acquired. In waveform signal s1a in a middle stage of FIG. 12, first intra-period rotation amount r1 that is an intra-period rotation amount of motor 30 in a period corresponding to first count value (n) is indicated by a white circle. A position of the white circle coincides with a rising trigger of origin detection signal s2 illustrated in a lower part of FIG. 12.

Controller 50 stores first count value (n) and first intra-period rotation amount r1 acquired by origin acquirer 54 in storage 60.

FIG. 13 is a diagram illustrating another example of the origin set by resetting.

An upper part of part (a) of FIG. 13 illustrates count value c2 indicating an integrated value of a plurality of periods and second count value c2(n+1) that is an integrated value of a plurality of periods when origin detection signal s2 is acquired. In waveform signal s1a in a middle part of part (a) of FIG. 13, second intra-period rotation amount r2 that is an intra-period rotation amount of motor 30 in a period corresponding to second count value (n+1) is indicated by a black circle. A position of the black circle coincides with a rising trigger of origin detection signal s2 illustrated in a lower part of part (a) of FIG. 13.

In addition, as illustrated in part (a) of FIG. 13, second intra-period rotation amount r2 corresponding to origin detection signal s2 falls within ±0.5 periods with, as a reference, first intra-period rotation amount r1 within the period of the period corresponding to first count value c1(n). This configuration is realized by designing repeated detection error α in detecting the origin to be smaller than rotation range β of motor 30 corresponding to each period of the plurality of periods detected by periodic sensor 10. It is possible to accurately reproduce the position of the origin by this design.

A specific example of a method for setting the origin will be described with reference to parts (a) and (b) of FIG. 13.

As illustrated in part (a) of FIG. 13, in a case where second intra-period rotation amount r2 is positioned in a period different from the period corresponding to first count value (n), controller 50 corrects the origin by causing first count value c1(n) to coincide with second count value c2(n+1). In this example, since second intra-period rotation amount r2 is at count value c2(n+1) different from first count value c1(n), the count value is incremented by one, and first count value c1(n) is changed to count value c2(n+1). The position of the origin is a value expressed by count value c2(n+1) and second intra-period rotation amount r2.

In addition, as illustrated in part (b) of FIG. 13, in a case where second intra-period rotation amount r2 is positioned at the same period as the period corresponding to first count value (n), controller 50 sets the origin by using second count value c2(n) as it is. That is, in this example, since second intra-period rotation amount r2 is at same count value c2(n) as first count value c1(n), a value of first count value c1(n) is maintained. The position of the origin is a value expressed by count value c1(n) and second intra-period rotation amount r2. The origin reset as described above is an origin when power is turned on again.

(Conclusion)

As described above, position detection device 1 according to the present exemplary embodiment includes motor 30 that rotates drive target 40, periodic sensor 10 that detects a plurality of periods included in a periodic change generated by rotation of motor 30, origin sensor 20 that detects an origin of motor 30 in a rotation direction, and controller 50 that controls the rotation of motor 30 based on signals output from each of periodic sensor 10 and origin sensor 20. Repeated detection error α in detecting the origin by origin sensor 20 is smaller than rotation range β of motor 30 corresponding to each period of the plurality of periods detected by periodic sensor 10.

As described above, repeated detection error α in detecting the origin is set to be smaller than rotation range β of motor 30 corresponding to each period, and thus, for example, the position of the origin detected when the origin is reset can be corrected in accordance with the position of the origin detected when the origin is initially set. As a result, the position of the origin can be accurately reproduced in position detection device 1.

In addition, motor 30 may have a plurality of magnetic poles 34 arranged along the rotation direction, the plurality of magnetic poles 34 may rotationally move with the rotation of motor 30, and periodic sensor 10 may detect a plurality of periods by detecting changes in magnetic field generated by the rotational movement of the plurality of magnetic poles 34.

As described above, periodic sensor 10 detects the plurality of periods due to the changes in magnetic field, and thus, rotation ranges 13 of motor 30 corresponding to the plurality of periods can be accurately acquired. As a result, the position of the origin can be accurately acquired, and the position of the origin can be accurately reproduced in position detection device 1.

In addition, periods may be in one-to-one correspondence with magnetization periods of the plurality of magnetic poles 34 arranged along the rotational direction.

As described above, the periods detected by periodic sensor 10 are in one-to-one correspondence with the magnetization periods of the plurality of magnetic poles 34, and thus, rotation ranges β of motor 30 corresponding to the plurality of periods can be accurately acquired. As a result, the position of the origin can be accurately acquired, and the position of the origin can be accurately reproduced in position detection device 1.

In addition, each of repeated detection error α and rotation range β of motor 30 may be a value represented by an angle in the rotation direction.

Accordingly, an angular position of the origin detected when the origin is reset can be corrected in accordance with an angular position of the origin detected when the origin is initially set. As a result, position detection device 1 can accurately reproduce the angular position of the origin.

In addition, periodic sensor 10 may detect the period multiple times in the movable range of motor 30, and origin sensor 20 may detect the origin once in the movable range of motor 30.

As described above, periodic sensor 10 detects a larger number of periods than origin sensor 20, and thus, the position of the origin can be accurately acquired by using periodic sensor 10 and origin sensor 20. Accordingly, the position of the origin can be accurately reproduced in position detection device 1.

In addition, periodic sensor 10 may output waveform signal s1 having the plurality of periods to controller 50, origin sensor 20 may output origin detection signal s2 indicating that the origin is detected to controller 50, and controller 50 may acquire cumulative rotation amount rc that is a cumulative value of an intra-period rotation amount of motor 30 with the origin as a reference by (i) obtaining intra-period rotation amount r of motor 30 in each period of the plurality of periods and count value c that is an integrated value of the plurality of periods based on waveform signal s1 and (ii) obtaining the origin of motor 30 based on origin detection signal s2, to control the rotation of motor 30.

Accordingly, the origin of motor 30 can be accurately obtained based on waveform signal s1 and origin detection signal s2. In addition, cumulative rotation amount rc of motor 30 with the origin as the reference is acquired, and thus, the accuracy of the position control of the rotation of motor 30 can be enhanced.

In addition, periodic sensor 10 may output waveform signal s1 having the plurality of periods to controller 50, origin sensor 20 may output origin detection signal s2 indicating that the origin is detected to controller 50, and controller 50 may 1) calculate, when the origin of motor 30 is initially set, first count value c1 that is an integrated value of the plurality of periods when origin detection signal s2 is acquired and first intra-period rotation amount r1 that is an intra-period rotation amount of motor 30 in a period corresponding to first count value c1, based on waveform signal s1 output from periodic sensor 10, and 2) calculate, when the origin of motor 30 is reset, second count value c2 that is an integrated value of the plurality of periods when origin detection signal s2 is acquired and second intra-period rotation amount r2 that is an intra-period rotation amount of motor 30 in a period corresponding to second count value c2, and set the origin by using first intra-period rotation amount r1, second intra-period rotation amount r2, first count value c1, and second count value c2.

As described above, the origin is set by using first intra-period rotation amount r1, second intra-period rotation amount r2, first count value c1, and second count value c2, and thus, the position of the origin detected when the origin is reset can be corrected in accordance with the position of the origin detected when the origin is initially set. As a result, the position of the origin can be accurately reproduced in position detection device 1.

In addition, second intra-period rotation amount r2 may be within ±0.5 periods with, as a reference, first intra-period rotation amount r1 in the period corresponding to first count value c1.

As described above, since second intra-period rotation amount r2 is within ±0.5 periods with first intra-period rotation amount r1 as the reference, and thus, the position of the origin detected when the origin is reset can be corrected in accordance with the position of the origin detected when the origin is initially set. As a result, the position of the origin can be accurately reproduced in position detection device 1.

In addition, in a case where second intra-period rotation amount r2 is positioned in a period different from the period corresponding to first count value c1, controller 50 may set the origin by causing first count value c1 to coincide with second count value c2.

Accordingly, the position of the origin detected when the origin is reset can be corrected in accordance with the position of the origin detected when the origin is initially set. As a result, the position of the origin can be accurately reproduced in position detection device 1.

In addition, position detection device 1 may further include storage 60 that stores first count value c1 and first intra-period rotation amount r1, and controller 50 may set the origin by using first count value c1 and first intra-period rotation amount r1 stored in storage 60 and second count value c2 and second intra-period rotation amount r2.

As described above, first count value c1 and first intra-period rotation amount r1 are stored in storage 60, and thus, the position of the origin detected when the origin is reset can be corrected in accordance with the position of the origin stored in storage 60. As a result, the position of the origin can be accurately reproduced in position detection device 1.

In addition, imaging device 5 according to the present exemplary embodiment includes position detection device 1 and drive target 40 including camera 45.

Accordingly, it is possible to provide imaging device 5 including position detection device 1 that can accurately reproduce the position of the origin.

Other Exemplary Embodiments

Although the exemplary embodiment has been described above, the present disclosure is not limited to the exemplary embodiment.

Periodic sensor 10 of the above exemplary embodiment is not limited to a magnetic sensor. For example, the periodic sensor may be a sensor that detects a periodic change, and may be an optical sensor. Origin sensor 20 of the above exemplary embodiment is not limited to the transmissive photoelectric sensor. For example, the origin sensor may be a sensor that can detect the origin of motor 30, and may be a reflective photoelectric sensor, a magnetic sensor, or a mechanical switch sensor.

In addition, in position detection device 1 of the above exemplary embodiment, the following origin setting method may be executed. That is, an origin setting method of the position detection device is an origin setting method of position detection device 1 that includes motor 30 that rotates drive target 40, periodic sensor 10 that detects a plurality of periods included in a periodic change generated by the rotation of motor 30, origin sensor 20 that detects an origin of motor 30 in a rotation direction, and controller 50 that controls the rotation of motor 30 based on signals output from periodic sensor 10 and origin sensor 20. The method includes 1) a step of outputting, by periodic sensor 10, waveform signal s1 having a plurality of periods to controller 50, 2) a step of outputting, by origin sensor 20, origin detection signal s2 indicating that the origin is detected to controller 50, 3) a step of calculating first count value c1 that is an integrated value of a plurality of periods when origin detection signal s2 is acquired and first intra-period rotation amount r1 that is an intra-period rotation amount of motor 30 in a period corresponding to first count value c1 based on waveform signal s1 output form periodic sensor 10 when the origin of the motor 30 is reset, and (4) a step of calculating second count value c2 that is an integrated value of a plurality of periods when the origin detection signal is acquired and second intra-period rotation amount r2 that is an intra-period rotation amount of motor 30 in a period corresponding to second count value c2 based on the waveform signal output from periodic sensor 10 when the origin of motor 30 is reset, and setting the origin by using first intra-period rotation amount r1, second intra-period rotation amount r2, first count value c1, and second count value c2.

General or specific aspects of the present disclosure may be realized by a system, a device, a method, an integrated circuit, a computer program, or a computer-readable recording medium such as a CD-ROM. In addition, such aspects may also be realized by any combinations of a system, a device, a method, an integrated circuit, a computer program, and a recording medium.

In addition, the order of the kinds of processing described in the flowchart of the above exemplary embodiment and the like is an example. The order of the plurality of kinds of processing may be changed, or the plurality of kinds of processing may be executed in parallel.

In addition, the division of the functional blocks in the block diagram is only by way of example, and a plurality of functional blocks may be realized as one functional block, one functional block may be divided into a plurality of functional blocks, or a part of the functions may be transferred to another functional block. In addition, functions of a plurality of functional blocks that have similar functions may be processed in parallel or in a time-sharing manner by a single piece of hardware or software.

In addition, in the above exemplary embodiment and the like, each constituent element (for example, processor such as the controller) may be dedicated hardware, or may be realized by executing a software program suitable for each constituent element. A program execution unit such as a central processing unit (CPU) or a processor reads and executes a software program stored in a recording medium such as a hard disk and a semiconductor memory, and thus, each constituent element may be realized. In addition, for example, each constituent element may be a circuit (or an integrated circuit). These circuits may constitute one circuit as a whole or may be separate circuits. In addition, each of these circuits may be a general-purpose circuit or a dedicated circuit.

In addition, the present disclosure includes other exemplary embodiments obtained by making various modifications conceived by those skilled in the art to the above exemplary embodiment and the like, or other exemplary embodiments realized by any combination of the constituent elements and functions in each exemplary embodiment without departing from the spirit of the present disclosure.

The position detection device and the like of the present disclosure can be used for a monitoring camera device and the like.

What is claimed is:

1. A position detection device comprising:
a motor configured to rotate a drive target;
a periodic sensor configured to detect a plurality of periods included in a periodic change generated by rotation of the motor;
an origin sensor configured to detect an origin of the motor in a rotation direction; and
a controller configured to control the rotation of the motor based on: (i) a waveform signal output from the periodic sensor to the controller, the waveform signal having the plurality of periods; and (ii) an origin detection signal output from the origin sensor to the controller, the origin detection signal indicating that the origin of the motor is detected,
wherein:
a repeated detection error in detecting the origin of the motor by the origin sensor is smaller than a rotation range of the motor corresponding to each period of the plurality of periods detected by the periodic sensor; and
the controller is further configured to:
calculate, when the origin of the motor is initially set, a first count value that is an integrated value of the plurality of periods when the origin detection signal is acquired and a first intra-period rotation amount that is an intra-period rotation amount of the motor in a period corresponding to the first count value, based on the waveform signal output from the periodic sensor;
calculate, when the origin of the motor is reset, a second count value that is an integrated value of the plurality of periods when the origin detection signal is acquired and a second intra-period rotation amount that is an intra-period rotation amount of the motor in a period corresponding to the second count value, based on the waveform signal output from the periodic sensor; and
set the origin of the motor using the first intra-period rotation amount, the second intra-period rotation amount, the first count value, and the second count value.

2. The position detection device according to claim 1, wherein the second intra-period rotation amount is within ±0.5 periods with, as a reference, the first intra-period rotation amount in the period corresponding to the first count value.

3. The position detection device according to claim 2, wherein, in a case where the second intra-period rotation amount is in a period different from the period corresponding to the first count value, the controller is configured to set the origin of the motor by causing the first count value to coincide with the second count value.

4. The position detection device according to claim 1, further comprising a storage configured to store the first count value and the first intra-period rotation amount, wherein the controller is configured to set the origin of the motor using the first count value and the first intra-period rotation amount stored in the storage, and the second count value and the second intra-period rotation amount.

* * * * *